United States Patent
Kolacz et al.

(10) Patent No.: US 12,492,951 B2
(45) Date of Patent: Dec. 9, 2025

(54) PIEZO-ELECTRO-OPTIC COMPOSITE TRANSDUCTION DEVICES

(71) Applicant: The Government of the United States of America, as represented by the Secretary of the Navy, Arlington, VA (US)

(72) Inventors: Jakub Kolacz, Washington, DC (US); Peter Finkel, Washington, DC (US); Julia Pavlova, Washington, DC (US); Christopher M. Spillmann, Washington, DC (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 891 days.

(21) Appl. No.: 17/735,613

(22) Filed: May 3, 2022

(65) Prior Publication Data
US 2022/0373409 A1 Nov. 24, 2022

Related U.S. Application Data

(60) Provisional application No. 63/185,548, filed on May 7, 2021.

(51) Int. Cl.
*G01L 1/16* (2006.01)
*G02F 1/11* (2006.01)
*H10N 30/30* (2023.01)

(52) U.S. Cl.
CPC ............... *G01L 1/16* (2013.01); *G02F 1/11* (2013.01); *H10N 30/302* (2023.02)

(58) Field of Classification Search
CPC ..................................... G01L 1/16; G02F 1/11
See application file for complete search history.

(56) References Cited

U.S. PATENT DOCUMENTS

| | | | | | |
|---|---|---|---|---|---|
| 4,410,823 | A | * | 10/1983 | Miller | H03H 9/02779 29/25.35 |
| 5,504,772 | A | * | 4/1996 | Deacon | H01S 3/108 372/102 |
| 6,167,169 | A | * | 12/2000 | Brinkman | G02F 1/011 385/16 |
| 10,247,761 | B2 | | 4/2019 | Müller et al. | |
| 2004/0075779 | A1 | * | 4/2004 | Paukshto | G02F 1/13338 349/12 |
| 2016/0077649 | A1 | * | 3/2016 | Ando | G06F 3/0445 345/174 |

OTHER PUBLICATIONS

W. H. Liew, M. S. Mirshekarloo, S. Chen, K. Yao, and F. E. H. Tay, "Nanoconfinement induced crystal orientation and large piezoelectric coefficient in vertically aligned P(VDF-TrFE) nanotube array," Sci. Rep. 5, 1-7 (2015).

* cited by examiner

Primary Examiner — J. Todd Newton
(74) Attorney, Agent, or Firm — US Naval Research Laboratory; William P. Ladd

(57) ABSTRACT

Piezo-optic transducers convert variations in mechanical stress to a change in optical properties by coupling electro-optic and piezo-electric elements in a format suited to a single composite device without needing on-board electronics.

8 Claims, 10 Drawing Sheets

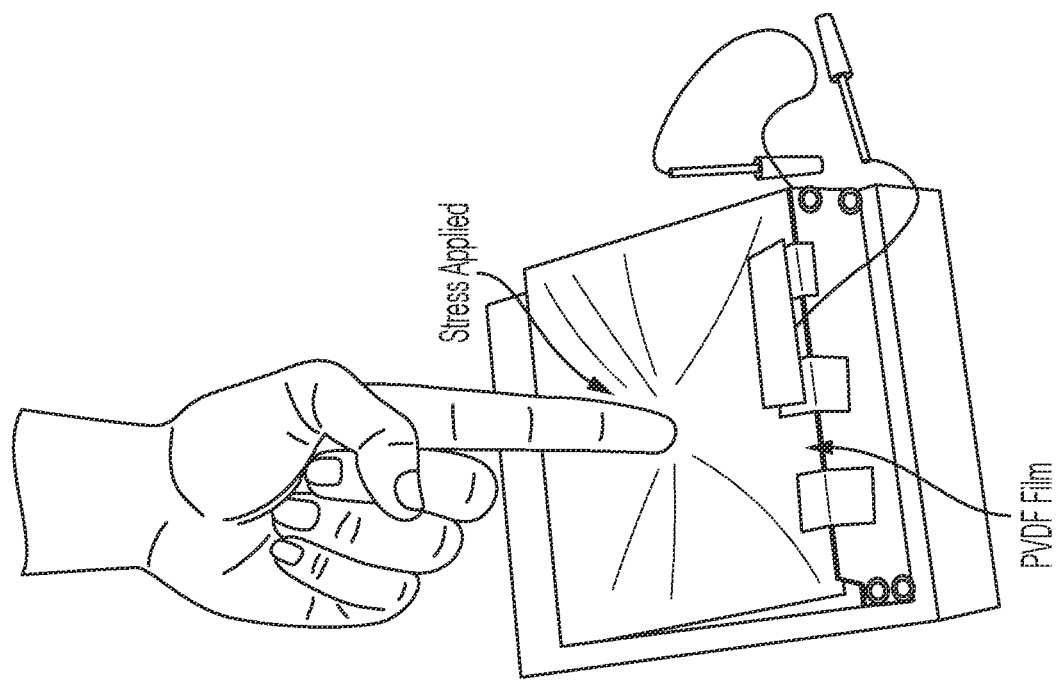

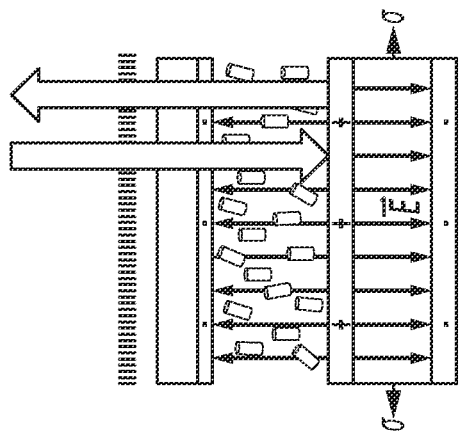
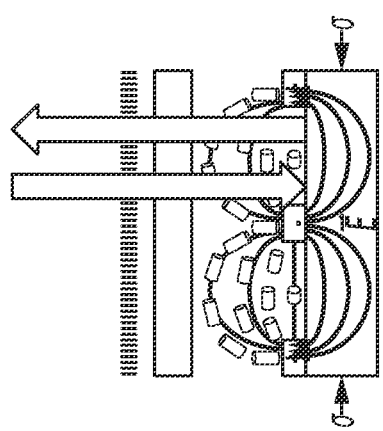
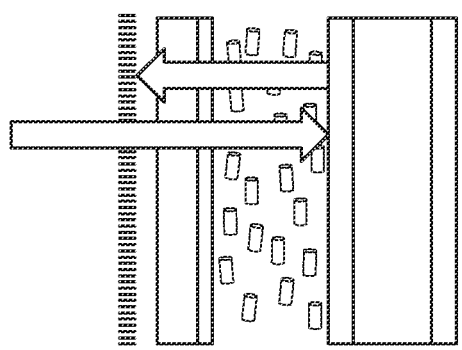
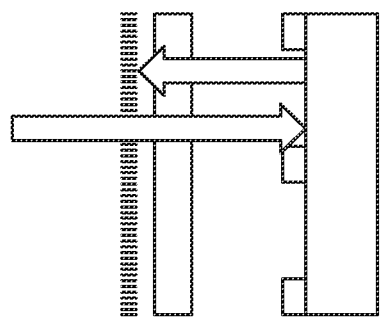
FIG. 8A
FIG. 8B
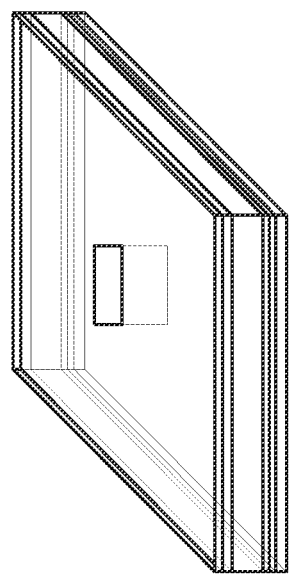
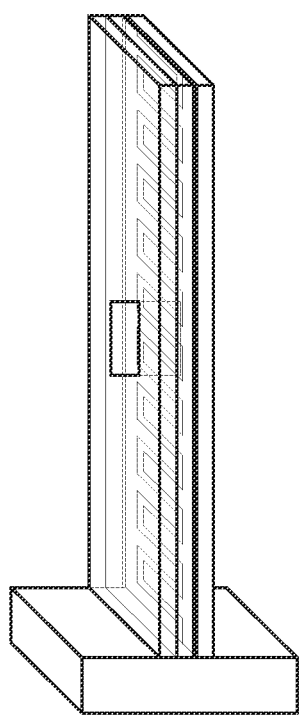

PIEZO-ELECTRO-OPTIC COMPOSITE TRANSDUCTION DEVICES

CROSS-REFERENCE TO RELATED APPLICATIONS

This application claims the benefit of U.S. Provisional Patent Application No. 63/185,548 filed on May 7, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 112188.

BACKGROUND

Certain materials convert mechanical stress, a, directly into a change in optical retardance through the piezo-optic effect. This behavior is quantified using the piezo-optic coefficient, defined as ratio of optical retardance R to the mechanical stress a, and is traditionally on the order of 1 Brewster (B) ($10^{-12}$ $m^2/N$) [see ref. 1]. This pathway is demonstrated in FIG. 1A.

A need exists for alternative approaches for transduction of mechanical stress into optical phenomena.

BRIEF SUMMARY

Described herein are piezo-optic transducers that convert variations in mechanical stress to a change in optical properties by directly coupling electro-optic and piezo-electric elements in a format suited to a single composite device without needing on-board electronics. This approach uses two transduction processes that are more efficient than the piezo-optic effect, namely the piezoelectric effect and the electrooptic effect, to more efficiently convert an applied stress to a change in optical retardance, as seen in FIG. 1B.

In one embodiment, a transducer system includes a piezo-electric film; a first pair of electrodes in electrical contact with the piezo-electric film; a liquid crystal (LC) confined in a transparent cavity; and a second pair of electrodes in contact with the LC and electrically connected to the first pair of electrodes, wherein pressure applied to the piezo-electric film produces a voltage carried through the two pairs of electrodes, thus causing a change in the optical properties of the LC.

In a further embodiment, the first pair of electrodes are in contact with opposite sides of the piezo-electric film in a $d_{33}$ mode configuration.

In another embodiment, the first pair of electrodes are an interdigitated set of electrodes electrically connected to the piezo-electric film in a $d_{31}$ mode configuration.

In yet another embodiment, a compact form factor transducer includes a piezo-electric film; an optically reflective electrode in contact with a top surface of the piezo-electric film; a liquid crystal (LC) in contact with the electrode; and an optical polarizer positioned above the LC, wherein strain applied to the piezo-electric film induces an electric field in the electrode sufficient to cause a change in reflection of light passing through the optical polarizer, through the LC, reflecting from the electrode to pass again through the LC and the optical polarizer.

In a still further embodiment, a compact form factor transducer includes an optically reflective piezo-electric component; a set of interdigitated electrodes atop the piezo-electric component with gaps therebetween; a liquid crystal (LC) in contact with the electrodes; and an optical polarizer positioned above the LC, wherein strain applied to the piezo-electric film induces an electric field in the electrodes sufficient to cause a change in reflection of light passing through the optical polarizer, through the LC, reflecting from the piezo-electric component to pass again through the LC and the optical polarizer.

Also contemplated are methods of using the above embodiments for detecting force, wherein a stress-induced strain applied to a piezo-electric material causes a detectable optical change in a liquid crystal connected thereto.

BRIEF DESCRIPTION OF THE DRAWINGS

In FIG. 1A, piezo-optic materials directly convert mechanical stress into optical retardance using the piezo-optic effect, which a coupling coefficient of one Brewster or 1 B. FIG. 1B illustrates how piezo-optic composite transducers couple piezoelectricity and the electro-optic effect. The theoretical enhancement of effective piezo-optic coupling coefficient is $10^3$ B.

FIGS. 5A-5C show experimental results for the first exemplary configuration.

FIGS. 8A and 8B depict piezo-optic transducers suited to small form factors.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Figure 1B:
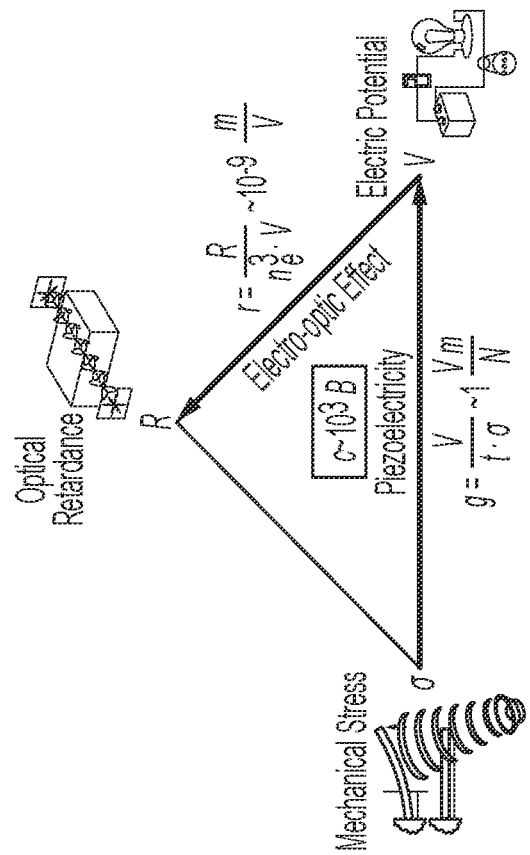
FIGS. 1A and 1B illustrate two schemes for piezo-optic transduction.
Figure 1A:
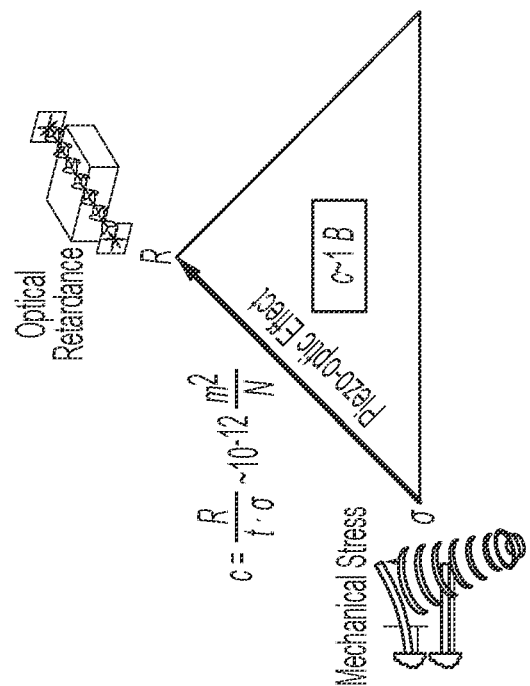
Figure 2A:
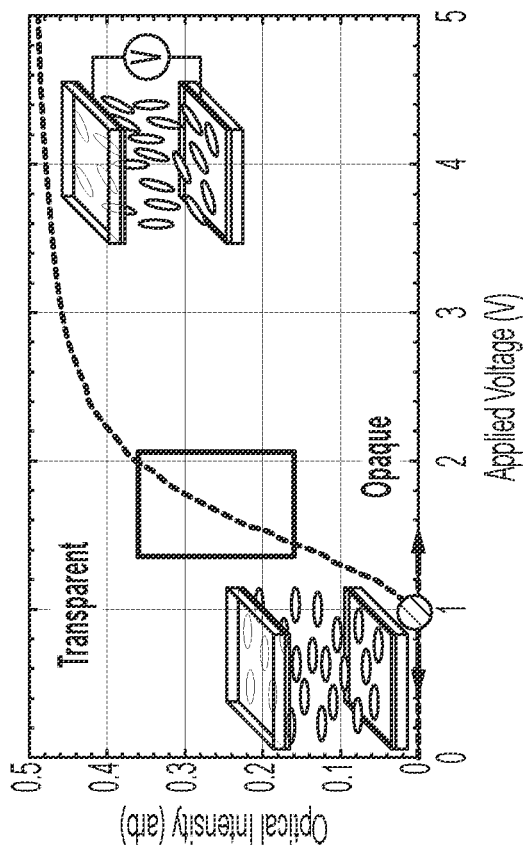
FIGS. 2A and 2B illustrate the electro-optic response of liquid crystals (LC).
Figure 2B:
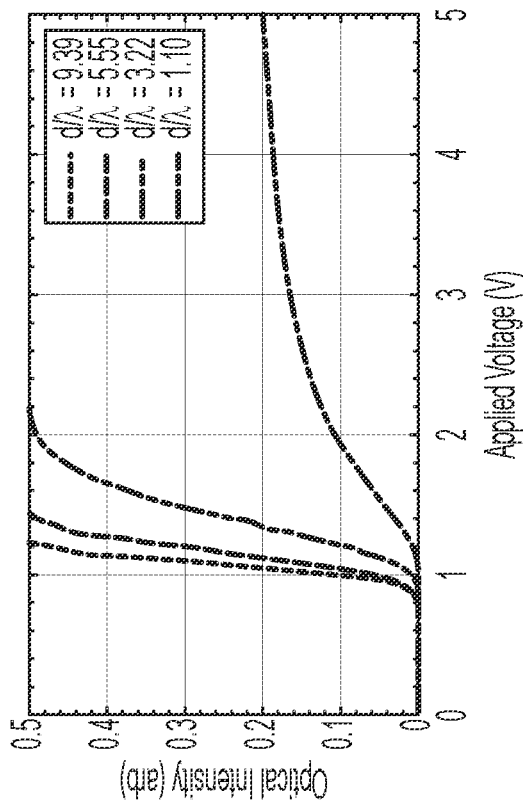

Electrooptic materials transduce electric fields into changes in optical retardance and are quantified using the Electro-Optic Coefficient $r=\Delta R/\Delta V$ [see refs. 2,3]. The most efficient materials in this regard are currently believed to be Liquid Crystals (LCs). LC is a phase of matter in which long range positional order leads to anisotropic properties, while thermal fluctuations allow the material to flow like a fluid [see ref. 4]. One type of LC, the nematic phase, is comprised of rod-like molecules with an averaged preferred orientation axis. The alignment of LC molecules gives rise to anisotropic macroscopic properties such as birefringence and dielectric anisotropy, which lead to optical activity and tunability with an external field, respectively [see ref. 5]. The change in optical properties due to reorientation of LC molecules as an external field is applied is a nonlinear threshold behavior [see refs. 6-8] shown in FIG. 2A, which shows transmission through a LC component between parallel polarizers as a function of voltage. Above a threshold voltage (~1V), the LC reorients and increases transparency in a nonlinear fashion. FIG. 2B shows that the slope of the change in optical properties can be tuned by changing the ratio of the thickness, d, to the wavelength of probing light, $\lambda$. In this way, the optical response of the LC can be controlled by tuning the threshold voltage, or region where the LC begins to respond to the field, or the slope of the response (FIG. 2B). By tuning these parameters, electro-optic coefficients can be >1000 nm/V ($10^{-9}$ m/V).

Piezoelectric materials transduce mechanical stress, via strain of the piezoelectric material, into an accumulated electric charge. The efficiency of this process can be quantified by the Piezoelectric Voltage Coefficient g [[$g_{ij}=-\Box E_i^{\Box\Box}{}_j$]] [see ref. 9]. Charge separation and the resulting voltage in piezoelectric materials can be generated using cantilever beams, cymbals and circular diaphragms [see ref. 10]. In an exemplary structure, a voltage is generated perpendicular or parallel to the strain in the $d_{33}$ mode or $d_{31}$ mode cantilever, respectively, which is shown in FIGS. 3A-3D. In the $d_{33}$ mode, force is applied in the same direction as the poling direction, such as the compression of a piezoelectric material. In the $d_{31}$ mode, lateral force is applied in the direction perpendicular to the poling direction/electric field.

Figure 3A:
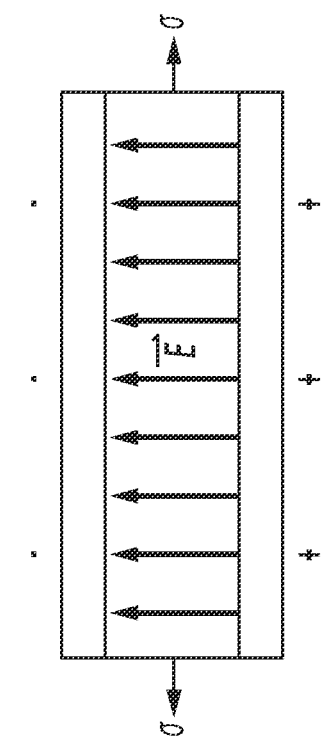
FIGS. 3A-3D illustrate piezoelectric configurations.
Figure 3B:
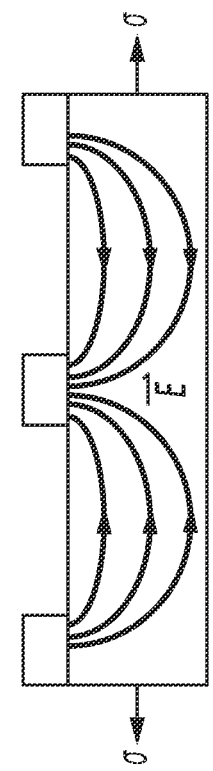

FIGS. 3A and 3B illustrate the $d_{33}$ mode, wherein electrodes sandwich the piezoelectric material. A force is applied to the cantilever (arrow in FIG. 3A), which results in a strain perpendicular to the applied force that generates an electric field between the electrodes seen in FIG. 3B.

Figure 3C:
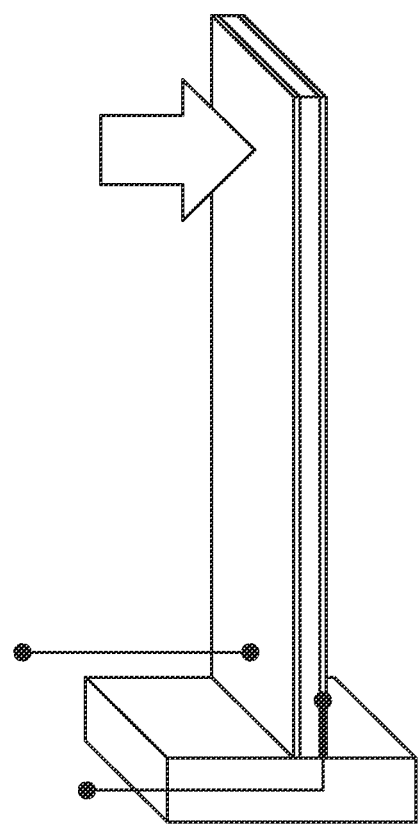
Figure 3D:
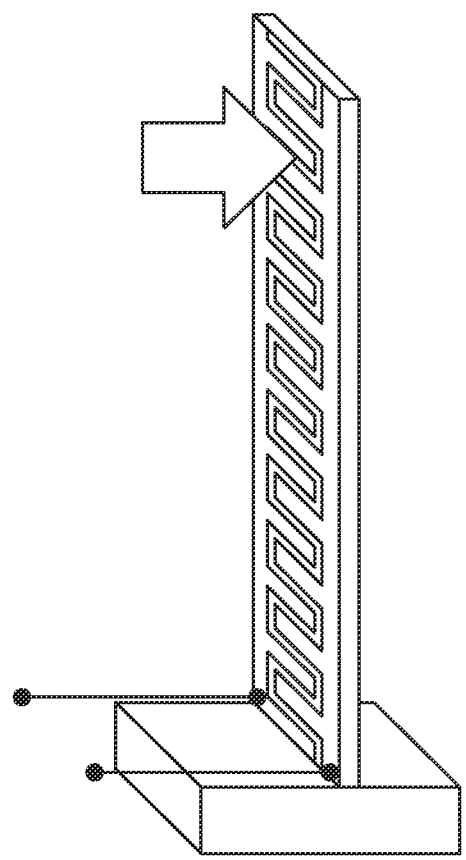

FIGS. 3C and 3D illustrate the $d_{31}$ mode, wherein interdigitated electrodes are patterned on the piezoelectric surface. A force is applied to the cantilever (arrow in FIG. 3C), which results in a strain perpendicular to the applied force that generates an electric field between the interdigitated electrodes as seen in FIG. 3D.

Certain materials such as vertically aligned P(VDF-TrFE) nanotube arrays [see ref. 11] can exhibit coefficients g>0.5 Vm/N. The effective Piezoelectric Voltage Coefficient can be further enhanced by processing piezoelectric materials into active fiber composites and by using interdigitated electrodes.

With lossless energy transfer, combining electrooptic and piezoelectric materials couples the electro-optic coefficient r with the piezoelectric voltage coefficient g to theoretically achieve an effective piezo-optic coefficient $c=g*r\sim10^3$ B ($10^{-9}$ m²/N).

Figure 4:
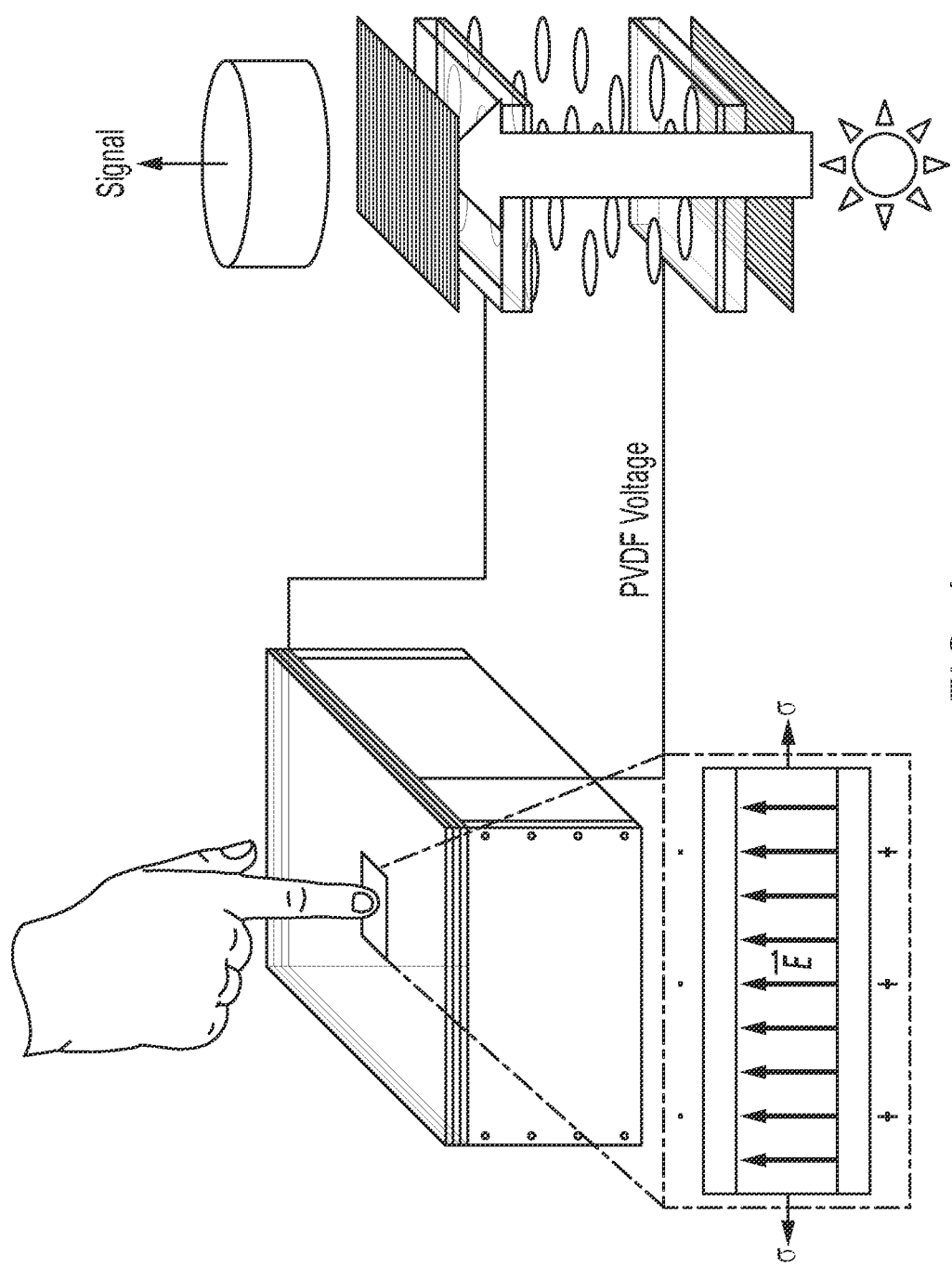
FIG. 4 schematically illustrates a first exemplary configuration.

In a first exemplary configuration, LC confined in a transparent cavity is straddled by electrodes, which are connected electrically to opposite sides of a piezo-electric film in a $d_{33}$ mode configuration. The LC component is placed between crossed polarizers with a light source (e.g., a source of red light) on one side and a photodetector on the opposite side. This exemplary configuration is schematically shown in FIG. 4. Mechanical stress is applied by straining the piezo-electric film constrained by a rigid frame. The charge buildup in the piezo-electric film is collected from the top and bottom of the film and directly applied across an optical stack, which consists of a LC component between crossed polarizers. The optical intensity is measured by placing the optical stack between a light source and a photodetector.

With constrained boundaries, the piezo-electric film stretches when pressure is applied to the center of the film, resulting in a radial stress perpendicular to the incident force. In this $d_{33}$ mode, the radial stress in the plane of the film induces orthogonal charge separation that is collected by metallic electrodes on opposing sides of the film. Through direct electrical contact, the charge separation in the piezo-electric film results in a voltage drop across the LC component. The LC reorients when the voltage drop is above the material's threshold voltage, resulting in a change in the effective retardance. The optical retardance is measured by placing the LC component between crossed polarizers and looking at light transmission through the resulting optical stack.

Figure 6:
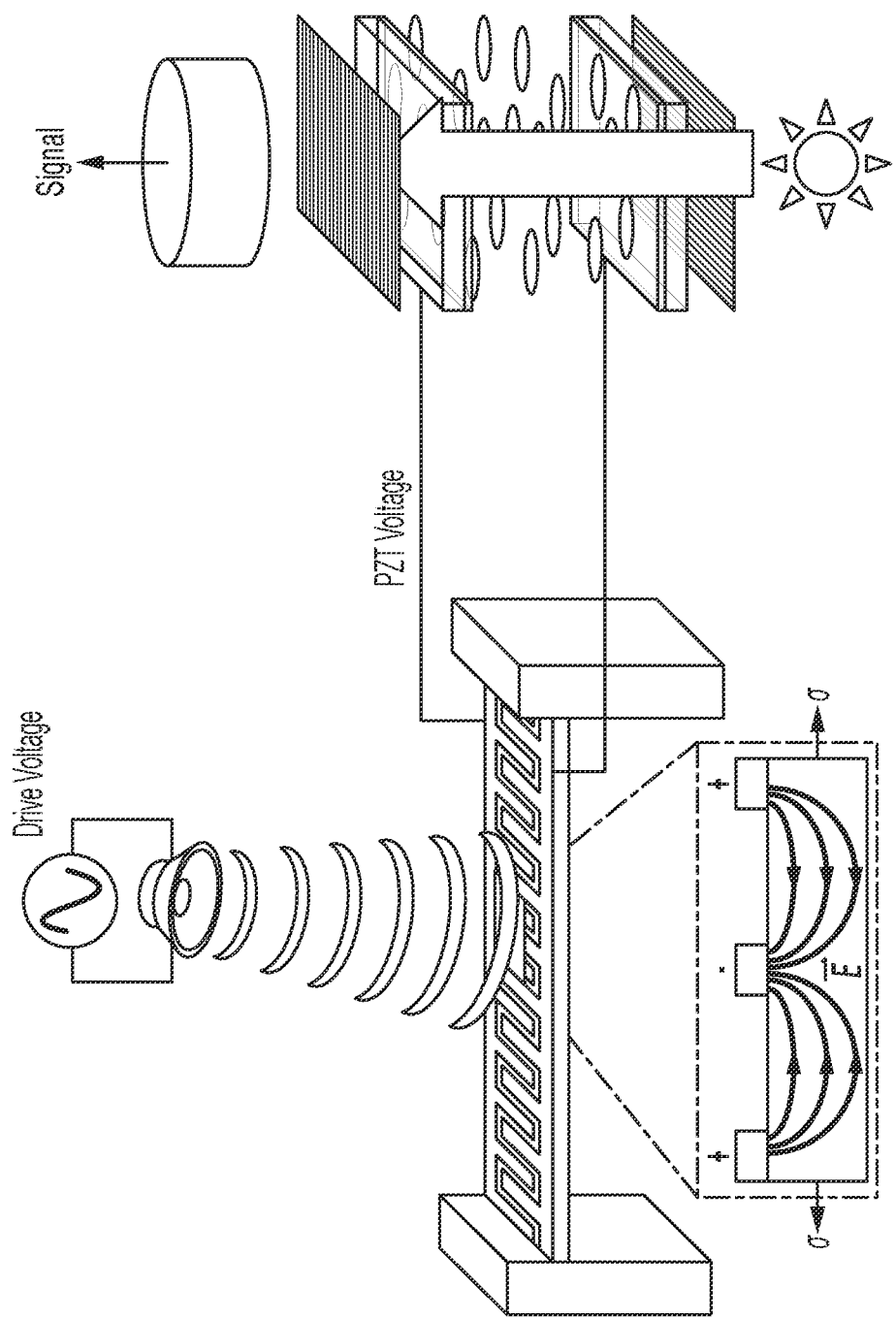
FIG. 6 schematically illustrates a second exemplary configuration.

In a second exemplary configuration, LC confined in a transparent cavity is straddled by electrodes, which are connected electrically to a set of interdigitated electrodes on a piezo-electric cantilever in a $d_{31}$ mode configuration. The LC component is placed between crossed polarizers with a light source (e.g., a source of red light) and a photodetector on the opposite side to monitor changes in the LC optical properties. An instance of this exemplary configuration is schematically illustrated in FIG. 6, showing how stress-induced mechanical strain on the lead zirconate titanate (PZT) cantilever might be applied by driving the material using an external speaker. The charge buildup on the PZT cantilever is collected using interdigitated electrodes on the surface and directly connected to an optical stack, which consists of a LC component between crossed polarizers. A red light source is represented with the upward-pointing arrow. The optical intensity is measured by placing the optical stack between a light source and a photodetector.

The components can be assembled to form transducers in compact form factors with readouts based on optical reflection. For example, due to the orientation of the electrodes, one might conveniently couple the Electrically Controlled Birefringence (ECB) LC mode with the $d_{33}$ mode piezoelectric. One exemplary configuration with a compact form factor is shown in FIG. 8A, where the induced field perpendicular to the strain can be directly applied to the LC. Here, the LC device may be fabricated in an ECB mode directly on top of a $d_{33}$ mode piezo-electric material as a sheet. The box in the left image represents the cross section. An electrode on top results in an induced electric field across the LC when a strain is applied to the film, leading to LC reorientation and a change in the optically reflected signal (arrows) when viewed through a polarizer. On the opposite side of the LC, a transparent electrode on a flexible substrate can be electrically connected to the bottom of the piezo-electric material or power supply or inherently charged to enhance the electric field across the LC and induce its reorientation. The metallic electrode on the piezo-electric component is used to reflect light that passes through the LC.

In another compact form fashion configuration, seen in FIG. 8B, the $d_{31}$ mode piezo-electric geometry can be used as a substrate for an In-Plane Switching (IPS) LC mode. Again, the box in the left image represents the cross section. The induced field is parallel to the strain results in alternating charges on the interdigitated electrodes, which can be used to reorient the LC in the plane of the device. The optically reflective piezo-electric component is used to reflect light that passes through the LC.

Examples

Figure 5C:
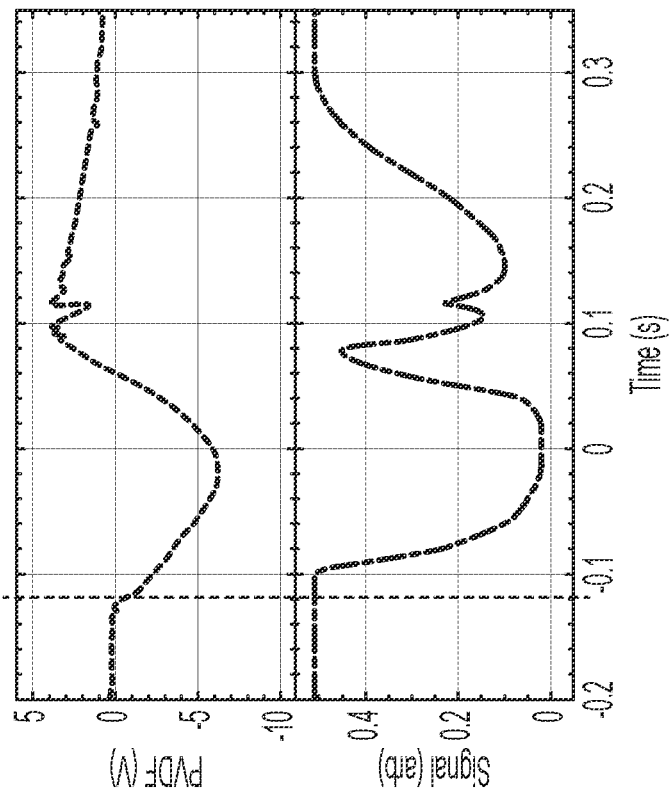
Figure 5B:
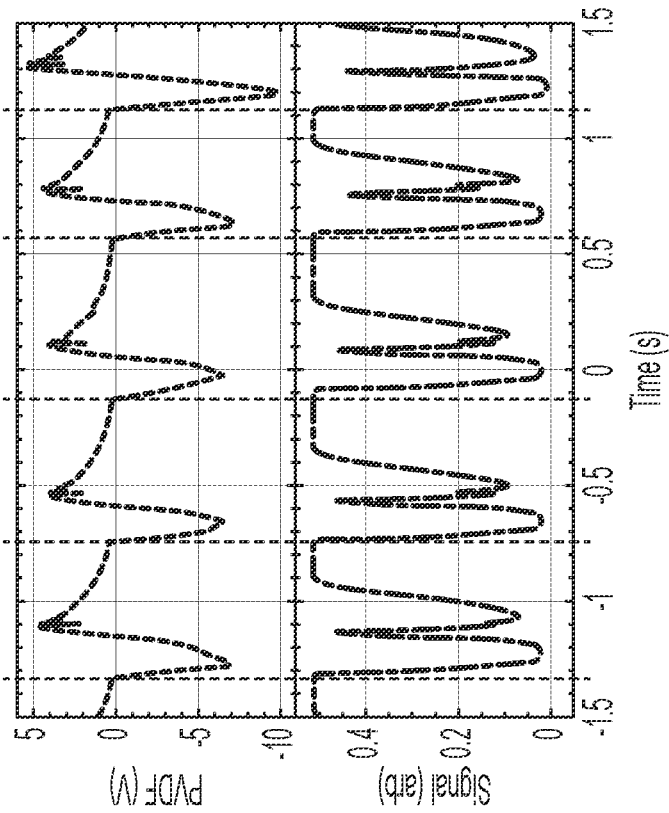

A transducer system of the first exemplary configuration was produced as depicted in part in FIG. 5A, showing a PVDF film confined in a 15 µm thick transparent cavity and held by a rigid frame which are connected with copper wire to opposite sides of a PVDF film in a $d_{33}$ mode configuration, with mechanical stress applied by a human finger. The voltage generated by the strain in the PVDF film and optical response were monitored using an oscilloscope, where the behavior was correlated with time. Experimental verification of this embodiment is shown in FIGS. 5B and 5C. During a stressed event, the voltage seen across the PVDF first goes negative and then swing positive as the charges re-equilibrate. This is seen in the curves in FIGS. 5B and 5C, showing data at different time scales. The response of the PVDF film and the LC (labeled Signal) can be seen when stress is applied to the film (dashed vertical lines). The LC responds to the voltage generated from the PVDF film by becoming less transparent between crossed polarizers. The LC signal responds to the magnitude of the voltage by spiking when the magnitude exceeds the threshold twice, once when the voltage is negative and once when it is positive. The optical signal in this embodiment directly follows the absolute value of the voltage generated from the piezoelectric component.

Figure 7A:
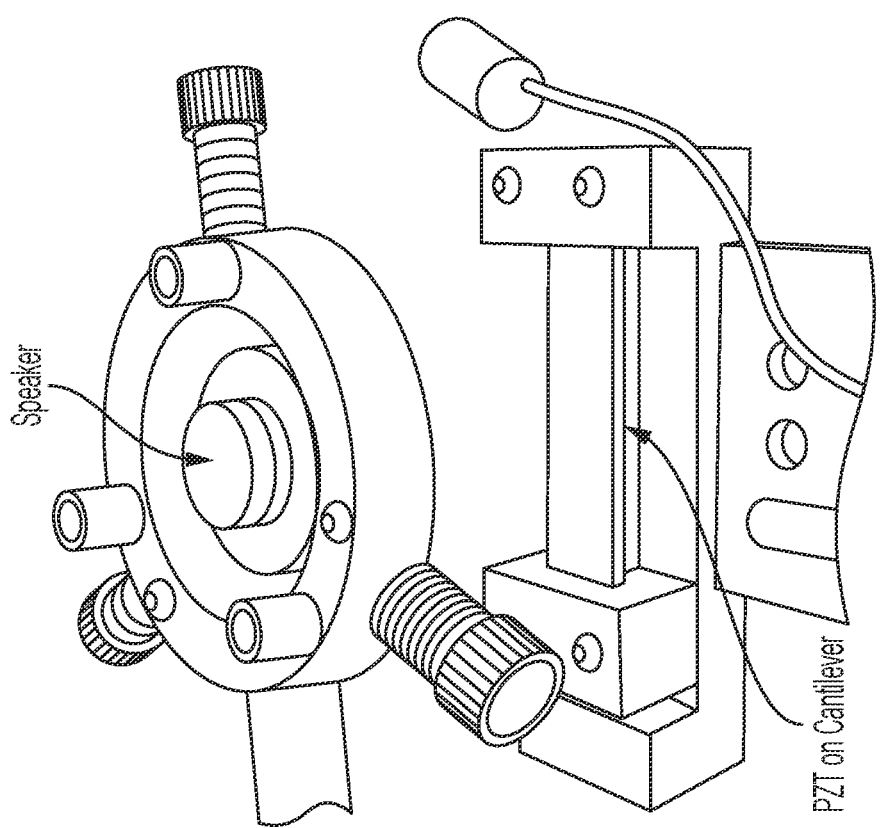
FIGS. 7A-7C show experimental results for the second exemplary configuration.
Figure 7B:
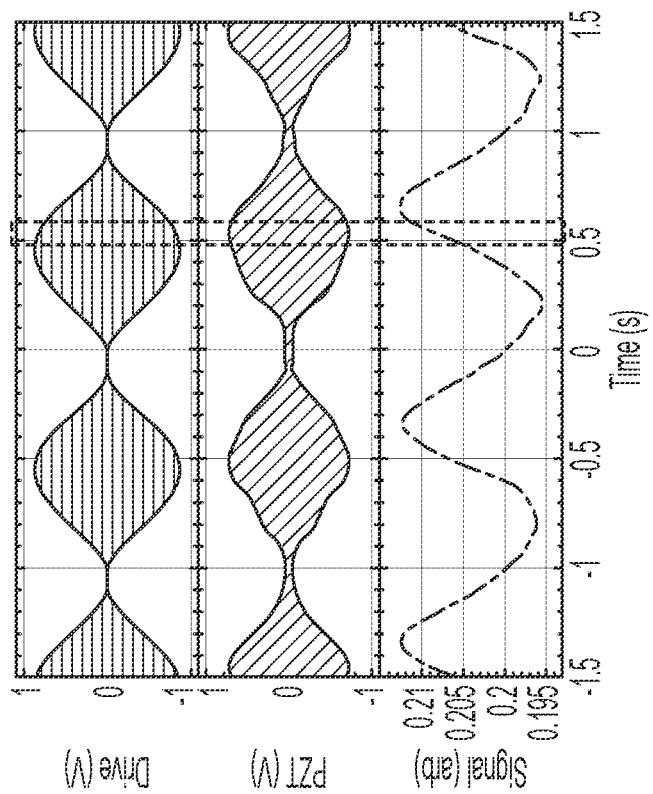
Figure 7C:
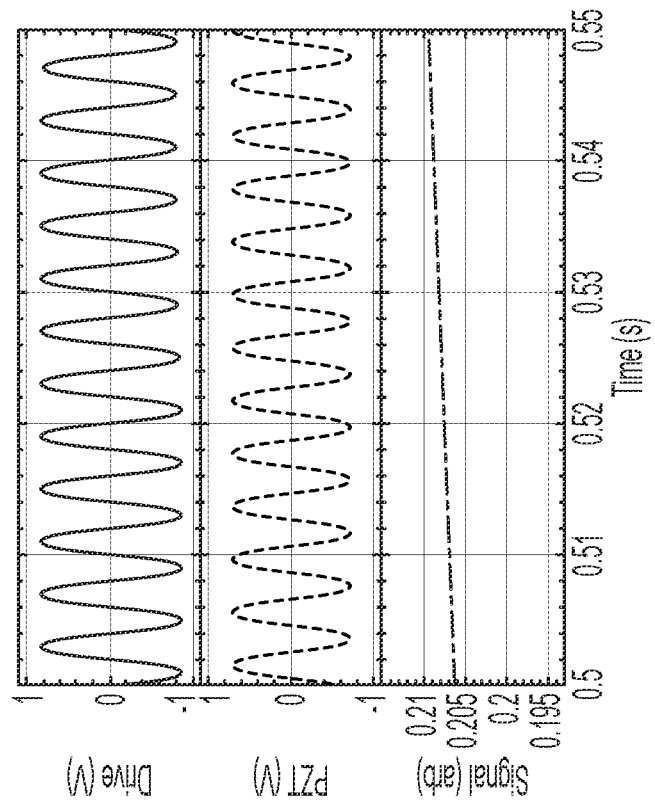

A transducer system of the second exemplary configuration was produced as depicted in part in FIG. 7A, with LC confined in a 15 µm thick transparent cavity is straddled by electrodes, which are connected with copper wire to a set of interdigitated electrodes on a PZT cantilever in a $d_{31}$ mode configuration. The PZT cantilever was tuned to a resonance of 249 Hz and positioned below an external speaker with a corresponding fixed drive frequency to acoustically induce resonance in the PZT cantilever. As the cantilever oscillated, an orthogonal stress was applied to the PZT material, which strained the material to generate an electric field and charge separation. In a $d_{31}$ mode, charge separation occurs in the direction of the applied stress. Interdigitated electrodes transmit the charge separation from the material to the LC component. Since the oscillation of the charge in the PZT cantilever (249 Hz) is faster than the LC response (~200 Hz), the optical response is unable to directly follow the induced voltage and instead the LC responds to the amplitude of the oscillations. FIGS. 7B and 7C show the response of the PZT cantilever and LC (labeled Signal) as the amplitude of the drive voltage of the speaker is modulated. The LC directly transduces the change in amplitude of the signal. FIG. 7C shows the short term (>200 Hz) response of the PZT cantilever and LC (labelled Signal) to a drive voltage applied across the speaker in the time period identified by the orange box in FIG. 7B. Since the oscillation in the drive voltage is faster than the LC response time, the optical signal corresponds to the root-mean-squared (RMS) signal from the PZT cantilever.

Further Embodiments

Electro-optic components can include, but are not limited to, any number of non-LC materials like quantum wells, e-ink or MEMs devices.

The electro-optically active LC may include a number of LC components and devices beyond nematic LC such as, but not limited to, Polymer-Dispersed LC (PDLC), Ferroelectric LC (FLC) and Cholesteric LC (CLC).

LC can possess positive or negative dielectric anisotropy.

LC can be confined in a number of display geometries including, but not limited to, Electrically Controlled Birefringence (ECB), In-Plane Switching (IPS), Fringe-Field Switching (FFS), Vertically Aligned (VA), Hybrid Aligned (HA), Twisted Nematic (TN) and Supertwisted Nematic (STN).

Piezo-electric materials can include, but are not limited to, ceramics such as lead zirconate titanate (PZT), polymers such as Polyvinylidene Difluoride (PVDF) and single crystal materials such as lead magnesium niobate-lead titanate (PMN-PT).

Additional energy to actuate the electro-optic component can be provided using an internal or external power source.

A composite can be pixelated to give a reference signal and/or to optically relay information on an array of piezo-electric sensors.

Advantages

As described herein, the optical relay of mechanical stress can be accomplished in a self-powered device without needing on-board electronics. The technique allows for wired separation of piezo-electric and electro-optic elements. Mechanical input can be directly transduced to an optical output at frequencies below the LC response time. In another embodiment, the technique allows for demodulated transduction of a mechanical stress to an optical output at frequencies above the LC response time through demodulation.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. A. K. Ahmad and M. F. Majeed, "Calculation of Acousto-Optic Figure of Merit for Some of Oxide Crystals," Int. J. Opt. Appl. 6, 1-6 (2016).
2. A. Yariv, *Optical Electronics* (Holt, Rinehart & Winston, 1985).
3. D. B. Chenault, R. A. Chipman, and S.-Y. Lu, "Electro-optic coefficient spectrum of cadmium telluride," Appl. Opt. 33, 7382 (1994).
4. P. G. de Gennes and J. Prost, *The Physics of Liquid Crystals* (Oxford University Press, 1993).
5. I. C. Khoo and S.-T. Wu, *Optics and Nonlinear Optics of Liquid Crystals* (World Scientific, 1993).

6. V. Fréedericksz and A. Repiewa, "Theoretisches und Experimentelles zur Frage nach der Natur der anisotropen Flüssigkeiten," Zeitschrift fïr Phys. 42, 532-546 (1927).
7. T. Motooka, A. Fukuhara, and K. Suzuki, "Freedericksz transition and anchoring effects in the oblique configuration of a nematic liquid crystal," Appl. Phys. Lett 34, 305-306 (1979).
8. V. Fréedericksz and V. Zolina, "Forces causing the orientation of an anisotropic liquid," Trans. Faraday Soc. 29, 919-930 (1933).
9. Y. Xu, *Ferroelectric Materials and Their Applications* (Elsevier Science Publishers B.V., 1991).
10. H. Li, C. Tian, and Z. D. Deng, "Energy harvesting from low frequency applications using piezoelectric materials," Appl. Phys. Rev. 1, (2014).
11. W. H. Liew, M. S. Mirshekarloo, S. Chen, K. Yao, and F. E. H. Tay, "Nanoconfinement induced crystal orientation and large piezoelectric coefficient in vertically aligned P(VDF-TrFE) nanotube array," Sci. Rep. 5, 1-7 (2015).

What is claimed is:

1. A transducer system, comprising:
a piezo-electric film;
a first pair of electrodes in electrical contact with the piezo-electric film;
a liquid crystal (LC) confined in a transparent cavity; and
a second pair of electrodes in contact with the LC and electrically connected to the first pair of electrodes, wherein strain applied to the piezo-electric film produces a voltage carried through the two pairs of electrodes, thus causing a change in the optical properties of the LC.

2. The transducer system of claim 1, wherein the first pair of electrodes are in contact with opposite sides of the piezo-electric film in a $d_{33}$ mode configuration.

3. The transducer system of claim 1, wherein the first pair of electrodes are an interdigitated set of electrodes electrically connected to the piezo-electric film in a $d_{31}$ mode configuration.

4. The transducer system of claim 1, further comprising crossed optical polarizers positioned on opposite sides of the LC.

5. The transducer system of claim 4, further comprising a light source configured to pass light through the LC and the crossed optical polarizers.

6. A compact form factor transducer, comprising:
a piezo-electric film;
an optically reflective electrode in contact with a top surface of the piezo-electric film;
a liquid crystal (LC) in contact with the electrode; and
an optical polarizer positioned above the LC, wherein strain applied to the piezo-electric film induces an electric field in the electrode sufficient to cause a change in reflection of light passing through the optical polarizer, through the LC, reflecting from the electrode to pass again through the LC and the optical polarizer.

7. A compact form factor transducer, comprising:
an optically reflective piezo-electric component comprising a piezo-electric film;
a set of interdigitated electrodes atop the piezo-electric component with gaps therebetween;
a liquid crystal (LC) in contact with the electrodes; and
an optical polarizer positioned above the LC, wherein strain applied to the piezo-electric film induces an electric field in the electrodes sufficient to cause a change in reflection of light passing through the optical polarizer, through the LC, reflecting from the piezo-electric component to pass again through the LC and the optical polarizer.

8. A method of detecting strain, comprising:
providing a transducer comprising a piezo-electric film and a liquid crystal (LC) operably connected thereto;
applying a force to the piezo-electric film; and
detecting a change in optical properties of the LC caused by said force.

* * * * *